(12) United States Patent
Kurnik et al.

(10) Patent No.: US 7,894,978 B2
(45) Date of Patent: Feb. 22, 2011

(54) DIAGNOSTIC SYSTEM AND METHOD FOR DETECTING TAMPERING OF VEHICLE SOFTWARE OR CALIBRATIONS

(75) Inventors: James T. Kurnik, Linden, MI (US); Terry E Downs, Canton, MI (US); Marcelleaus P. Baines, Grand Blanc, MI (US); Ronald J. Gaynier, Ann Arbor, MI (US)

(73) Assignee: GM Global Technology Operations, Inc.

( * ) Notice: Subject to any disclaimer, the term of this patent is extended or adjusted under 35 U.S.C. 154(b) by 301 days.

(21) Appl. No.: 12/060,421

(22) Filed: Apr. 1, 2008

(65) Prior Publication Data
US 2009/0195368 A1    Aug. 6, 2009

Related U.S. Application Data

(60) Provisional application No. 61/026,535, filed on Feb. 6, 2008.

(51) Int. Cl.
*G06F 19/00* (2006.01)

(52) U.S. Cl. .................................. 701/115; 702/85

(58) Field of Classification Search .................. 701/29, 701/35, 51, 101, 102, 114, 115; 702/85, 702/127, 182, 187; 726/26, 27; 340/426.1, 340/439, 5.31
See application file for complete search history.

(56) References Cited

U.S. PATENT DOCUMENTS

| | | | | |
|---|---|---|---|---|
| 5,896,083 A * | 4/1999 | Weisman et al. | ............. | 340/439 |
| 6,571,191 B1 * | 5/2003 | York et al. | .................... | 702/85 |
| 6,601,015 B1 * | 7/2003 | Milvert et al. | ............... | 702/182 |
| 6,678,606 B2 * | 1/2004 | Akins et al. | ................. | 701/114 |
| 2007/0085497 A1 * | 4/2007 | Popp et al. | .................. | 318/139 |

* cited by examiner

*Primary Examiner*—Thomas J Mullen

(57) ABSTRACT

A tamper detection system for a control module of a vehicle comprises first nonvolatile memory that stores N rewriteable components including at least one of calibration and software that is used to operate a controlled device of the vehicle, wherein N is an integer greater than zero. The N rewriteable components include an embedded part number (EPN) and an embedded verification number (EVN). Second nonvolatile memory includes a history buffer. A tampering detection module includes a calculated verification number (CVN) generator that generates a CVN for at least one of the N rewriteable components and that stores the CVN in the history buffer. A locking module selectively locks the history buffer under certain conditions.

15 Claims, 3 Drawing Sheets

DIAGNOSTIC SYSTEM AND METHOD FOR DETECTING TAMPERING OF VEHICLE SOFTWARE OR CALIBRATIONS

CROSS-REFERENCE TO RELATED APPLICATIONS

This application claims the benefit of U.S. Provisional Application No. 61/026,535, filed on Feb. 6, 2008. The disclosure of the above application is incorporated herein by reference.

FIELD OF THE DISCLOSURE

The present disclosure relates generally to vehicle control systems, and more particularly to vehicle tampering diagnostic systems and methods.

BACKGROUND OF THE DISCLOSURE

Automobile manufacturers guarantee the quality of their vehicles by offering warranties. The warranty typically includes powertrain components of the vehicle. For example, if a powertrain component malfunctions during the warranty, the manufacturer repairs the powertrain component at no additional cost to the customer.

The manufacturer tests, evaluates, and adjusts engine and transmission software and calibration data to optimize emissions, performance, durability and/or other design factors. Some customers may replace factory software or calibration data in an attempt to modify and/or improve the performance of their vehicle. The warranty typically excludes damage that occurs due to user modification. However, user modification may be difficult to detect.

For example, powertrain calibration data relating to electronic throttle control (ETC), fuel injection, transmission shift points, and/or turbocharger and supercharger set points may be modified to enhance vehicle performance. Increasing performance may damage and/or accelerate wear on the powertrain components. When damage occurs, some customers may reprogram the modified software or calibration data back to the factory software or calibration data and attempt to have damaged parts repaired under warranty. Without proof of the customer's modification, the manufacturer may honor the warranty, which unnecessarily increases warranty costs.

Some tampering detection systems and methods use an embedded part number (EPN) and an embedded verification number (EVN) in software and calibration data used in a control module. A history buffer is used to record and preserve the EPN and a calculated verification number (CVN) that is calculated in the control module using the same formula that was used to create the EVN. For example only, the EVN may be calculated based on the bits of the software and calibration data. The EPN, the EVN, and the CVN are used to detect unauthorized modifications to the software and calibration data.

However, it is possible to flash data into the control module to flush the history buffer and erase evidence of tampering. To combat this, the history buffer can be made larger to store more programming attempts. However, resources are often limited in embedded controllers. Large history buffers can easily consume hundreds or thousands of bytes of memory.

SUMMARY OF THE DISCLOSURE

A tampering detection system for a control module of a vehicle comprises first nonvolatile memory that stores N rewriteable components including at least one of calibration and software that is used to operate a controlled device of the vehicle, wherein N is an integer greater than zero. The N rewriteable components include an embedded part number (EPN) and an embedded verification number (EVN). Second nonvolatile memory includes a history buffer. A tampering detection module includes a calculated verification number (CVN) generator that generates a CVN for at least one of the N rewriteable components and that stores the CVN. A locking module selectively locks the history buffer under certain conditions described herein.

A method for detecting tampering in a control module of a vehicle comprises storing N rewriteable components including at least one of calibration and software that is used to operate a controlled device of the vehicle, wherein N is an integer greater than zero, and wherein the N rewriteable components include an embedded part number (EPN) and an embedded verification number (EVN); generating a CVN for at least one of the N rewriteable components; storing the CVN in a history buffer; and selectively locking the history buffer under certain conditions described herein.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the disclosure, its application, or uses. As used herein, the term module or device refers to an application specific integrated circuit (ASIC), an electronic circuit, a processor (shared, dedicated, or group) and memory that executes one or more software or firmware programs, a combinational logic circuit, and/or other suitable components that provide the described functionality.

The present disclosure embeds both a part number and a verification number into the software and calibration data that are used in the control module. A history buffer is used to store the verification numbers that are calculated in a control module using the same formula or algorithm that was used to create the embedded verification number. The embedded part number (EPN), the embedded verification number (EVN), and the calculated verification number (CVN) are used to detect unauthorized modifications to the software and calibration data.

The present disclosure detects customer tampering with the control module and preserves evidence of this tampering. Since the tampering may lead to hardware damage to a controlled device (for example, an engine or transmission), the present disclosure allows warranty claims to be denied when component damage occurs as a result of customer tampering.

More particularly, when the CVN does not match the EVN for the same EPN, the history buffer is locked to preserve evidence of the tampering. Each production release of software or calibration data may use a new EPN and EVN combination. The present disclosure also searches the history buffer of CVNs to determine whether the same EPN was stored with two different CVNs. If this condition occurs, the control module also determines that the software or calibration data was modified from the production release version.

When two different CVNs have the same EPN, the history buffer is locked to preserve evidence of the tampering. When the control module is programmed and the history buffer is full and locked (due to tampering), a search is performed to determine whether the EPN/CVN combination already exists in the history buffer. If the EPN/CVN combination already exists, then the programming count associated with that combination is incremented. Counts greater than one indicate that the part was flashed into the control module more than once. A diagnostic tool may be used to retrieve data from the history buffer.

While the foregoing description relates to the application of tampering detection to an engine control module of a vehicle, the present disclosure has application to any other type of control module that controls a device and that includes software or calibration data that can be tampered with. For example, the present disclosure may also apply to a transmission control module of a vehicle as well.

Figure 1:
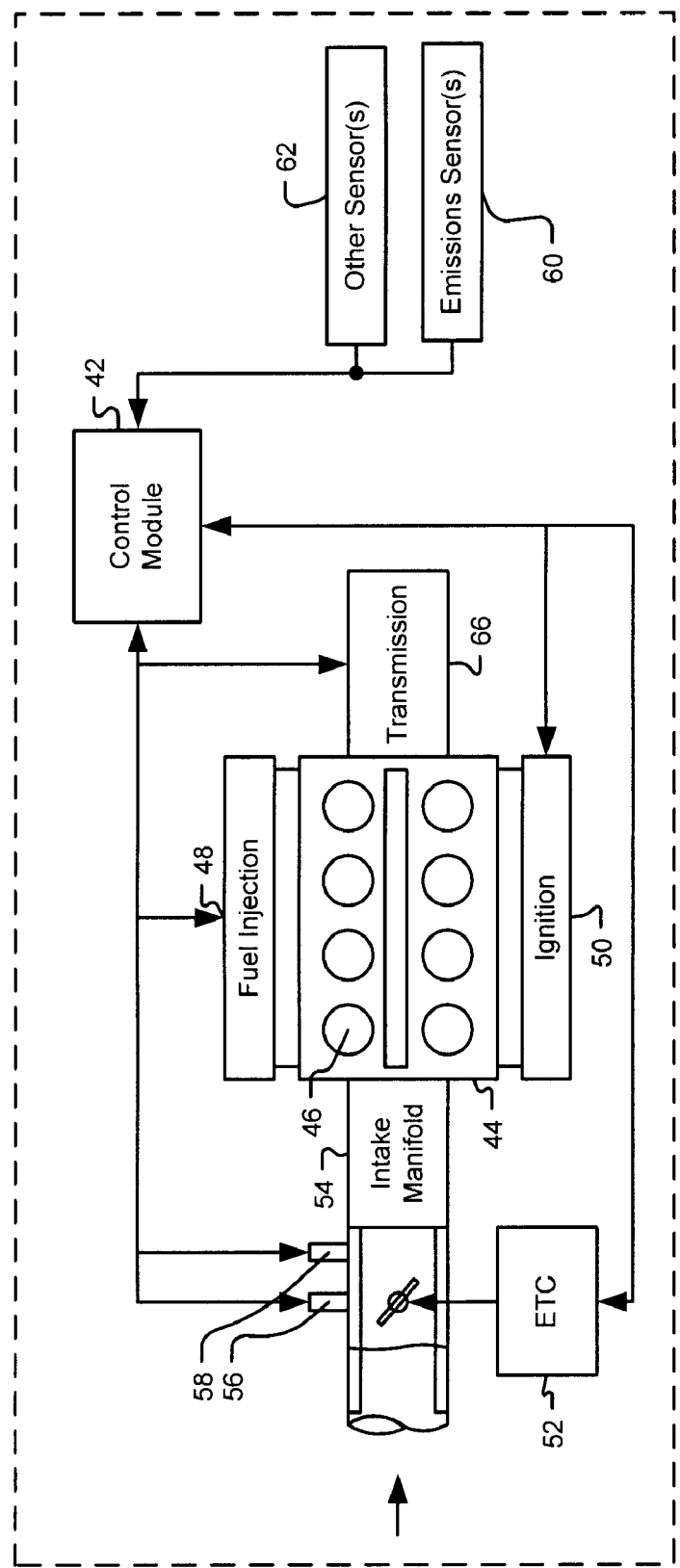
FIG. 1 is a functional block diagram illustrating an exemplary powertrain control system according to the present disclosure.

Referring now to FIG. 1, an exemplary vehicle control system 30 includes a control module 42 that controls operation of an engine 44 based on software and calibration data stored therein. The engine 44 includes a plurality of cylinders 46 each with one or more intake valves and/or exhaust valves (not shown). The engine 44 further includes a fuel injection system 48 and an ignition system 50. An electronic throttle control (ETC) 52 adjusts the throttle position in an intake manifold 54 based upon a position of an accelerator pedal (not shown) and a throttle control algorithm that is executed by the control module 42.

One or more sensors 56 and 58 such as a manifold pressure sensor and/or a manifold air temperature sensor, sense pressure and/or air temperature in the intake manifold 54. Emission sensors 60 and other sensors 62 such as a temperature sensor, a barometric pressure sensor, and/or other conventional sensors are used by the control module 42 to control the air/fuel ratio and emissions of the engine 44. Drive torque produced by the engine 44 is transferred by a transmission 66 to the front and/or rear wheels (not shown) of a vehicle.

Figure 2:
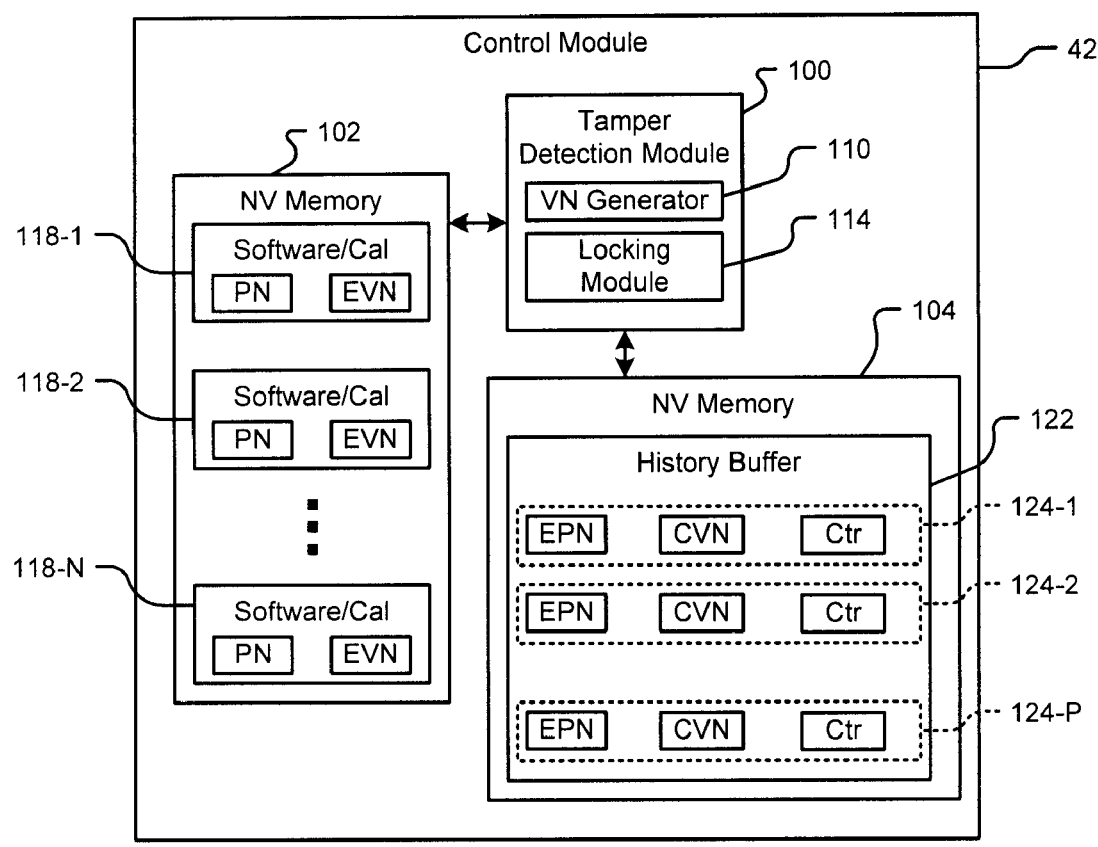
FIG. 2 is a functional block diagram of an exemplary control module.

Referring now to FIG. 2, an exemplary control module 42 is shown in further detail. The control module 42 includes a tamper detection module 100, nonvolatile memory 102, and nonvolatile memory 104. The nonvolatile memories 102 and 104 may be combined into a single nonvolatile memory or split into more than two non-volatile memories. The tamper detection module 100 further includes a verification number (VN) generator 110 that generates CVNs based on EPNs. The tamper detection module 100 further includes a locking module 114 that selectively locks the contents of the nonvolatile memory 104 as will be described further below.

The nonvolatile memory 102 stores rewriteable components such as software modules or calibration data 118-1, 118-2, ..., and 118-N (collectively rewritable components 118). Each of the rewritable components 118 includes an EPN and an EVN. Examples of the rewriteable components 118 include engine calibrations for fuel and spark timing, engine diagnostics for sensors, vehicle speed calibrations, vehicle interfaces, etc. Still other types of software and/or calibrations are contemplated.

The nonvolatile memory 104 includes a history buffer 122 that stores history data 124-1, 124-2, ..., and 124-P (collectively history data 124). The history data 124 may comprise the CVNs generated by the verification number (VN) generator 110. The array of the history buffer 122 may optionally store the EVN and/or a counter (CTR) for each combination as well.

Figure 3:
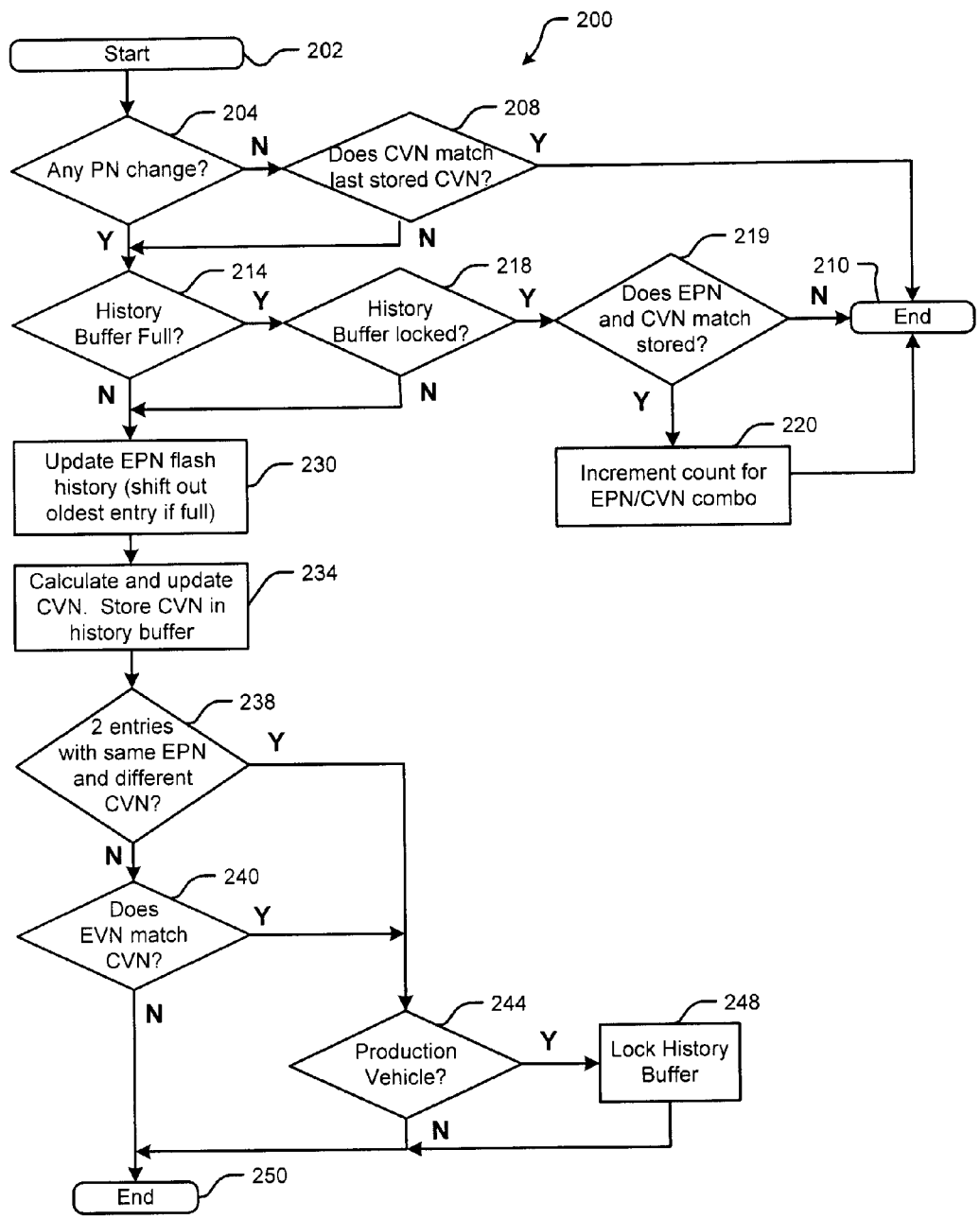
FIG. 3 is a flow chart illustrating exemplary steps for detecting tampering according to the present disclosure.

Referring now to FIG. 3, an exemplary method 200 for operating the tamper detection system of FIG. 2 is shown. Control begins with step 202. In step 204, control determines whether any of the EPNs of the rewritable components 118 have changed. If step 204 is false, control determines whether the CVN matches a last stored CVN for the part number. If step 208 is true, control ends. If step 204 is true or step 208 is false, control continues with step 214. In step 214, control determines whether the history buffer 122 is full. If the history buffer 122 is full, control determines whether the history buffer 122 is locked in step 218. If the history buffer 122 is locked, control determines whether the EPN/CVN combination matches a stored EPN/CVN in the history buffer 122 in step 219. If step 219 is false, control ends in step 210. If step 219 is true, control increments a counter for the EPN/CVN combination in step 220.

If step 214 or step 218 is false, control continues with step 230 and updates the history buffer 122 with the EPN (and optionally the EVN if desired). In step 234, the CVN for the EPN in step 230 is calculated, updated, and stored. In step 238, control determines whether there are two EPNs that are the same but have different CVNs. If step 238 is false, control determines whether the EVN matches the CVN for the EPN. If either of steps 238 or 240 is true, control continues with step 244. In step 244, control determines whether the vehicle is a production vehicle. In other words, there may be violations of the EPN/EVN for prototypes or preproduction vehicles. Therefore, the history buffer is not locked for these vehicles. If step 244 is true, control locks the history buffer 122 in step 248. If step 244 is false, control ends in step 250.

The CVNs can be generated based on the EVNs using any suitable algorithm. For example only, the CVN may be generated by shifting and then summing each byte of the software or calibration data with other bytes of the software or calibration data. Still other algorithms or methods may be used to generate the CVNs.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A tamper detection system for a control module of a vehicle, comprising:
   first nonvolatile memory that stores N rewriteable components each including at least one of calibration data and code that is used to operate a controlled device of said vehicle, wherein N is an integer greater than zero, wherein said N rewriteable components each include an embedded part number (EPN) and an embedded verification number (EVN);
   second nonvolatile memory that includes a history buffer that stores said EPNs and said EVNs of said N rewriteable components;

a tampering detection module that includes:
  a calculated verification number (CVN) generator that generates a CVN for each of said N rewriteable components and that stores a combination of said CVN, said EPN and said EVN of each of said N rewriteable components in said history buffer; and
  a locking module that selectively locks said history buffer when (i) a first one of said EPNs of a first one of said N rewriteable components matches a second one of said EPNs of a second one of said N rewriteable components and (ii) at least one of:
    said CVN of said first one of said N rewriteable components is different than said CVN of said second one of said N rewriteable components; and
    said CVN of said second one of said N rewriteable components is different than said EVN of said first one of said N rewriteable components.

2. The tamper detection system of claim 1 wherein said controlled device includes an engine of said vehicle.

3. The tamper detection system of claim 1 wherein said controlled device includes a transmission of said vehicle.

4. The tamper detection system of claim 1 wherein said history buffer stores a counter value for each of said N rewriteable components.

5. The tamper detection system of claim 4 wherein when said history buffer is locked and a new EPN and a new CVN match the EPN and the CVN of a stored one of said N rewriteable components, said tampering detection module increments said counter value.

6. The tamper detection system of claim 1 wherein said tamper detection system locks said history buffer only when said vehicle is a production vehicle.

7. The tamper detection system of claim 1 wherein each of said CVNs are generated based on corresponding ones of said EPNs and said at least one of calibration data and code in corresponding ones of said N rewriteable components.

8. The tamper detection system of claim 1 wherein said CVNs are generated based on corresponding ones of said EPNs and said at least one of calibration data and code in corresponding ones of said N rewriteable components.

9. A method for detecting tampering in a control module of a vehicle, comprising:

storing N rewriteable components each including at least one of calibration data and code that is used to operate a controlled device of said vehicle, wherein N is an integer greater than zero,
wherein said N rewriteable components each include an embedded part number (EPN) and an embedded verification number (EVN);
storing said EPNs and said EVNs of said N rewriteable components in a history buffer;
generating a CVN for each of said N rewriteable components;
storing a combination of said CVN, said EPN and said EVN of each of said N rewriteable components in said history buffer; and
selectively locking said history buffer when (i) a first one of said EPNs of a first one of said N rewriteable components matches a second one of said EPNs of a second one of said N rewriteable components and (ii) at least one of:
  said CVN of said first one of said N rewriteable components is different than said CVN of said second one of said N rewriteable components; and
  said CVN of said second one of said N rewriteable components is different than said EVN of said first one of said N rewriteable components.

10. The method of claim 9 wherein said controlled device includes an engine of said vehicle.

11. The method of claim 9 wherein said controlled device includes a transmission of said vehicle.

12. The method of claim 9 further comprising storing a counter value for each of said N rewriteable components in said history buffer.

13. The method of claim 12 further comprising incrementing said counter value when said history buffer is locked and a new EPN and a new CVN match the EPN and the CVN of a stored one of said N rewriteable components.

14. The method of claim 9 further comprising locking said history buffer only when said vehicle is a production vehicle.

15. The method of claim 9 further comprising generating said CVNs using an algorithm that is based on corresponding ones of said EPNs.

* * * * *